US009791099B1

(12) United States Patent
Page

(10) Patent No.: US 9,791,099 B1
(45) Date of Patent: Oct. 17, 2017

(54) PORTABLE LIFTING POLE DEVICE

(71) Applicant: Douglas M. Page, Arcadia, FL (US)

(72) Inventor: Douglas M. Page, Arcadia, FL (US)

( * ) Notice: Subject to any disclaimer, the term of this patent is extended or adjusted under 35 U.S.C. 154(b) by 0 days.

(21) Appl. No.: 15/151,703

(22) Filed: May 11, 2016

(51) Int. Cl.
*F16M 13/02* (2006.01)

(52) U.S. Cl.
CPC .................................. *F16M 13/022* (2013.01)

(58) Field of Classification Search
CPC .... F16M 13/022; A01K 39/014; A01K 39/00; A22B 5/00; B66C 23/00; B66C 23/20; B66D 1/00
USPC ................... 248/125.2, 332, 572, 32; 52/111
See application file for complete search history.

(56) References Cited

U.S. PATENT DOCUMENTS 338,920 A * 3/1886 Brady ...................... B66D 3/04 248/332
354,759 A * 12/1886 Adams ................... A61B 6/105 248/331
360,040 A * 3/1887 Nichols ................... F21V 21/38 248/320
498,570 A * 5/1893 Renehan ................. F21V 21/38 248/320
510,486 A * 12/1893 Renehan ................. F21V 21/38 212/76
694,866 A * 3/1902 Kaschewitz .......... E04H 12/182 182/145
1,699,587 A * 1/1929 Grenier ................... B66C 23/48 212/168
3,181,707 A * 5/1965 Janssen ................. B66C 23/163 212/202
3,713,262 A * 1/1973 Jatcko ..................... E01F 9/635 248/158
4,031,856 A 6/1977 Chester
4,462,599 A * 7/1984 Brown ............... A63B 69/0079 473/430
4,560,074 A * 12/1985 Manning ............... B66C 23/203 212/179
5,421,290 A 6/1995 Welch
D376,885 S * 12/1996 Carey ............................ D34/28
5,794,563 A 8/1998 Klepac
6,059,266 A 5/2000 Ascherin et al.
6,202,868 B1 * 3/2001 Murray .................... A22B 5/06 212/227
6,499,610 B2 * 12/2002 Spitsbergen ............ B66C 23/44 212/179
6,705,821 B2 * 3/2004 Philipps ................ B60P 1/5471 212/180
6,830,423 B1 * 12/2004 Williams .............. B60P 1/5471 212/180

(Continued)

OTHER PUBLICATIONS https://www.youtube.com/watch?v=2fpclwZxzy0, Aug. 29, 2014 D&B Tools.*

*Primary Examiner* — Muhammad Ijaz

(57) ABSTRACT

A portable lifting pole device for elevating items while camping or the like. The device includes a pole having a plurality of segments including a medial segment and a top segment. A lower aperture extends through the medial segment and an upper aperture extends through the top segment. A boom arm is coupled to and extends from the top segment. A line extends from a winch coupled to the pole under the lower aperture. The line extends into the pole through the lower aperture and out of the pole through the upper aperture. The line extends through a boom pulley coupled to the boom arm.

8 Claims, 5 Drawing Sheets

(56) References Cited

U.S. PATENT DOCUMENTS

| | | | | |
|---|---|---|---|---|
| 6,978,974 | B1 * | 12/2005 | Marasco | A63H 17/12 248/124.1 |
| 7,191,732 | B2 | 3/2007 | Neal, Jr. | |
| 7,314,406 | B2 | 1/2008 | Bilinovich | |
| 8,082,883 | B2 | 12/2011 | Aletti | |
| 8,104,430 | B1 | 1/2012 | Powell, Jr. | |
| 8,534,224 | B2 | 9/2013 | Welker | |
| 8,684,335 | B2 * | 4/2014 | Hayes | B66C 23/48 254/323 |
| 2003/0000906 | A1 * | 1/2003 | Perkins | B66C 23/44 212/180 |
| 2006/0045704 | A1 * | 3/2006 | Laufenberg | B60P 1/548 414/543 |
| 2007/0010356 | A1 * | 1/2007 | Moller, Jr. | A63B 63/083 473/483 |
| 2008/0173244 | A1 | 7/2008 | Welker | |
| 2011/0192390 | A1 * | 8/2011 | Johnson | A47J 33/00 126/30 |
| 2012/0312937 | A1 * | 12/2012 | Weber | A63B 67/10 248/125.2 |

* cited by examiner

PORTABLE LIFTING POLE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98.

The disclosure and prior art relates to pole devices and more particularly pertains to a new pole device for elevating items while camping or the like.

BRIEF SUMMARY OF THE INVENTION

An embodiment of the disclosure meets the needs presented above by generally comprising a pole having a plurality of segments including a medial segment and a top segment. A lower aperture extends through the medial segment and an upper aperture extends through the top segment. A boom arm is coupled to and extends from the top segment. A line extends from a winch coupled to the pole under the lower aperture. The line extends into the pole through the lower aperture and out of the pole through the upper aperture. The line extends through a boom pulley coupled to the boom arm.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
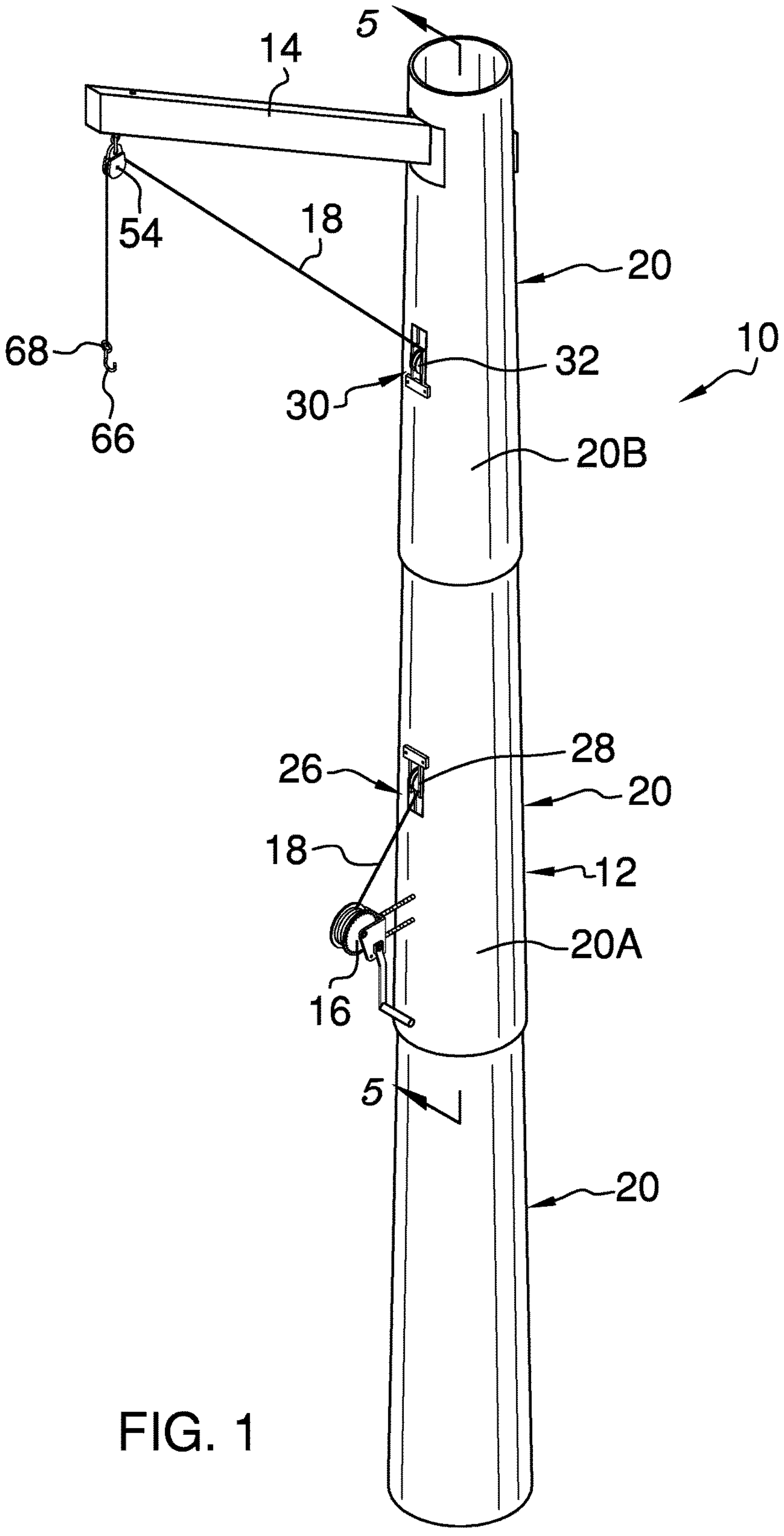
FIG. 1 is a top front side perspective view of a portable lifting pole device according to an embodiment of the disclosure.
Figure 2:
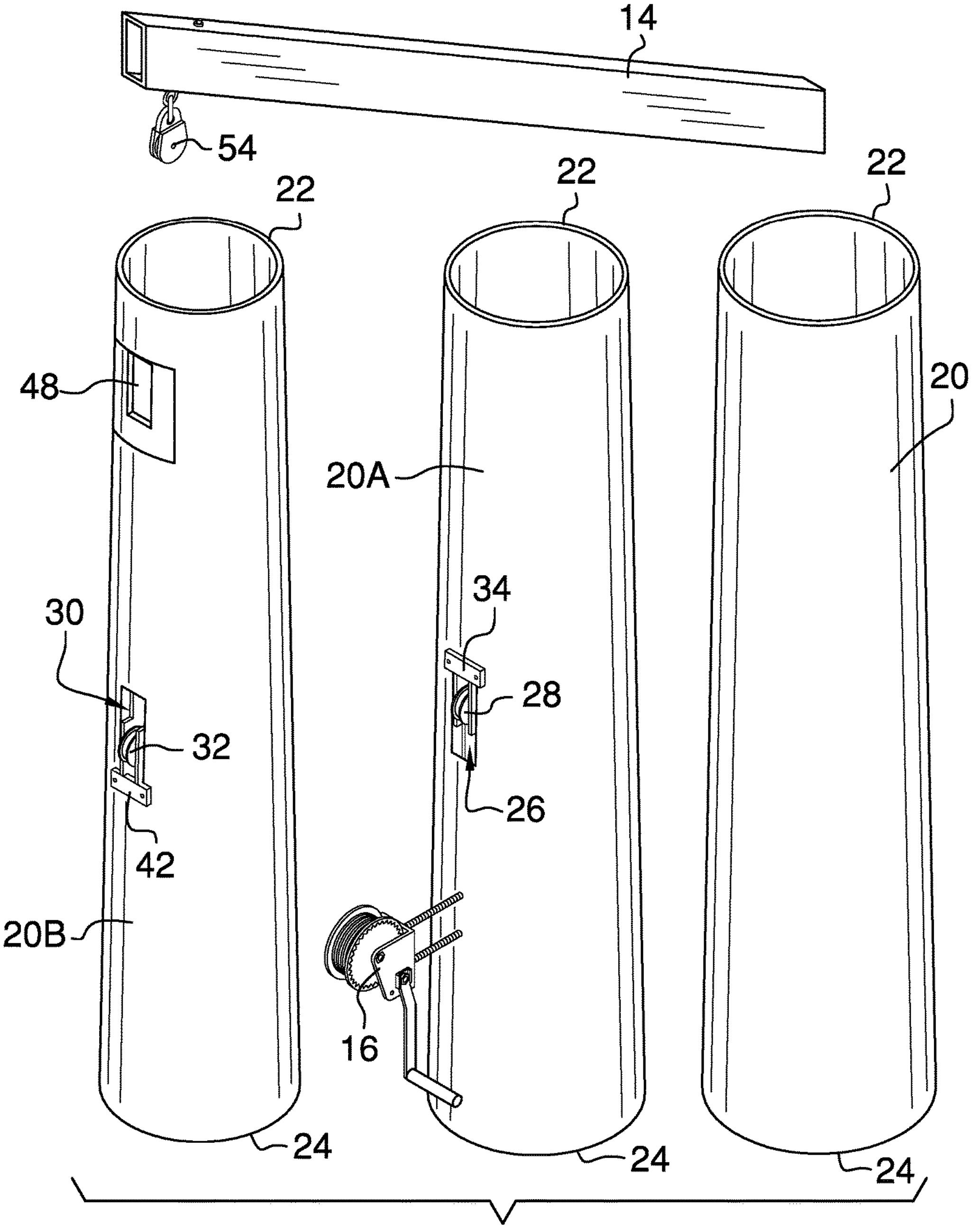
FIG. 2 is a top front side perspective view of an embodiment of the disclosure in a disassembled state.
Figure 3:
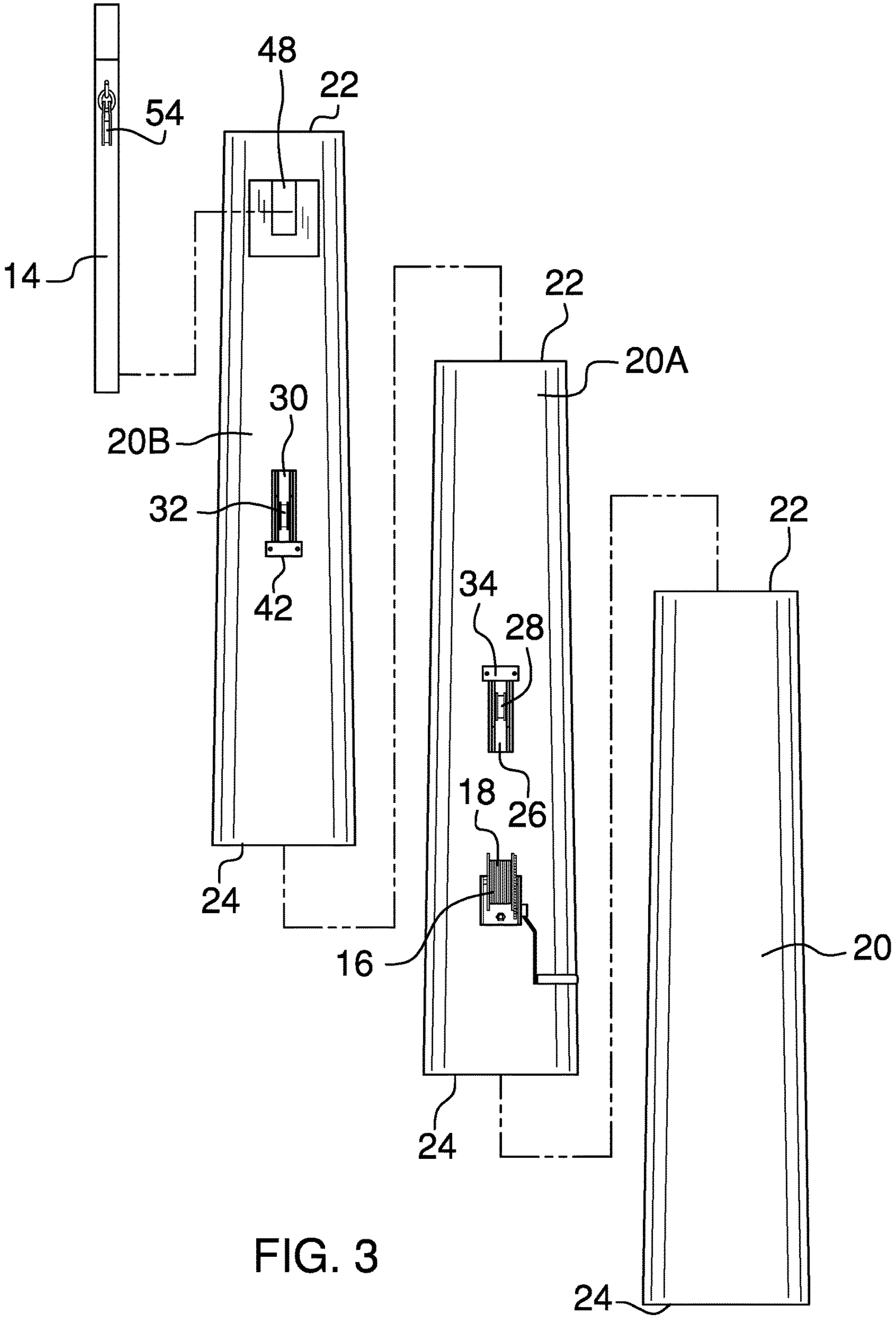
FIG. 3 is an exploded front view of an embodiment of the disclosure.
Figure 4:
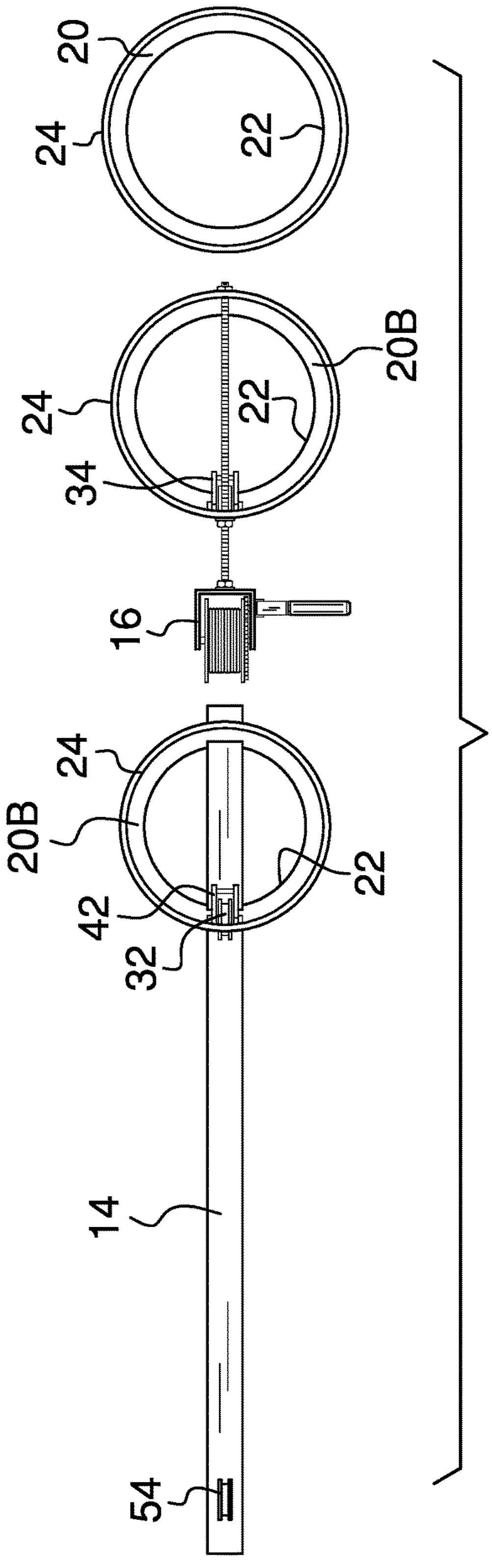
FIG. 4 is a partially exploded bottom view of an embodiment of the disclosure.
Figure 5:
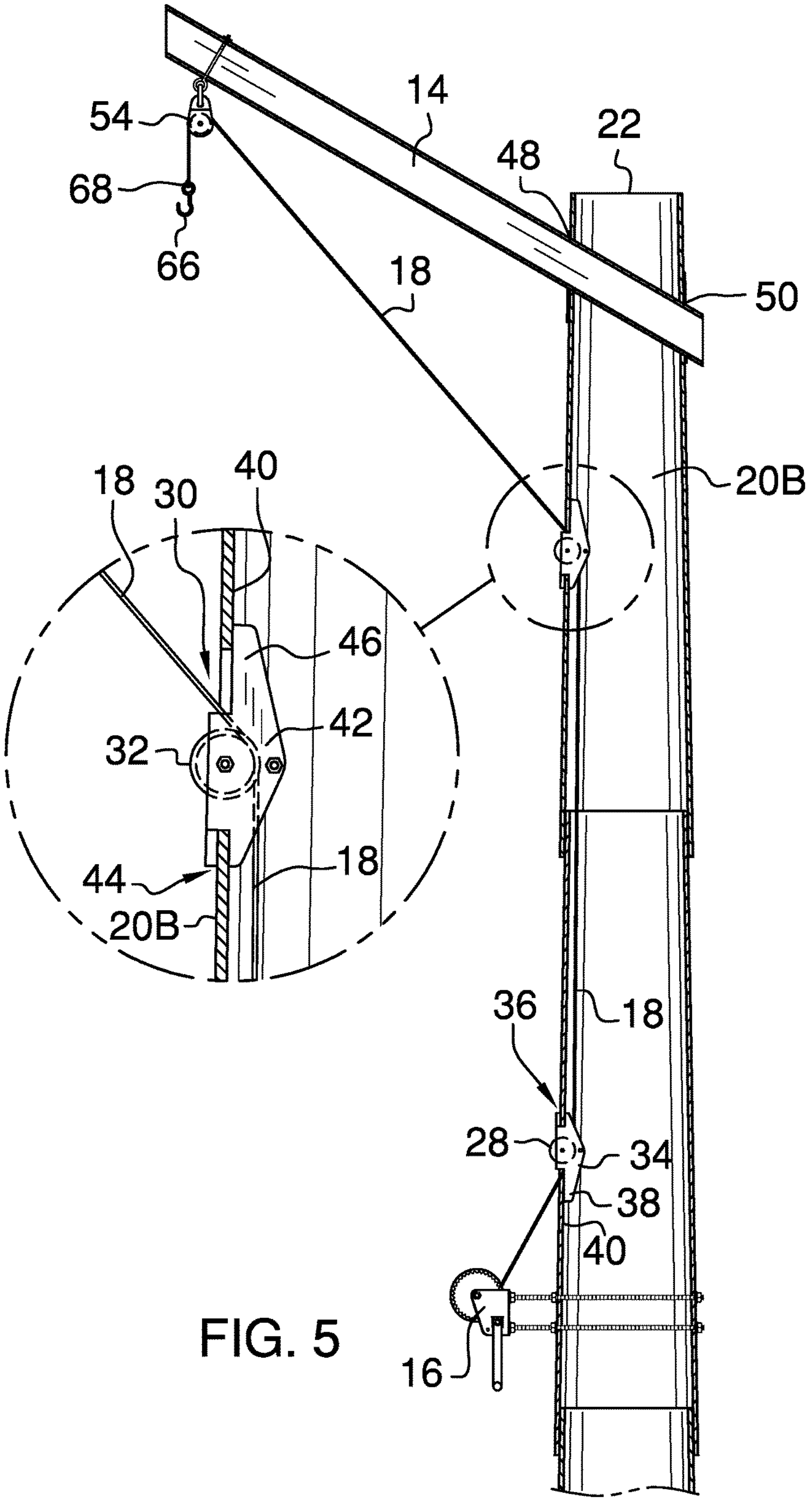
FIG. 5 is a cross-sectional view of an embodiment of the disclosure taken along line 5-5 of FIG. 1.

With reference now to the drawings, and in particular to FIGS. 1 through 5 thereof, a new pole device embodying the principles and concepts of an embodiment of the disclosure and generally designated by the reference numeral 10 will be described.

As best illustrated in FIGS. 1 through 5, the portable lifting pole device 10 generally comprises a pole 12, a boom arm 14, a winch 16, and a line 18. The pole 12 has a plurality of separable segments 20. Each segment 20 is generally cylindrical, hollow, and lightweight to facilitate carrying and transport of the segments 20. The segments 20 include a medial segment 20A and a top segment 20B. Each segment 20 has an upper end 22 and a lower end 24. Each segment 20 tapers from the lower end 24 to the upper end 22. The upper end 22 of each segment 20 is insertable into the lower end 24 of an adjacently positioned segment 20 wherein the segments 20 are stackable to form the pole 12. The winch 16 may be attached to the medial segment 20A by bolts, screws, or the like.

A lower aperture 26 extends through the medial segment 20A. A lower pulley 28 is coupled to the pole 12 and positioned in the lower aperture 26. Similarly, an upper aperture 30 extends through the top segment 20B and an upper pulley 32 is coupled to the pole 12 and positioned in the upper aperture 30. The lower pulley 28 is attached to the pole 12 using a lower pulley bracket 34. The lower pulley bracket 34 has a slotted end 36 and a projecting arm 38 extending outwardly opposite the slotted end 36 of the lower pulley bracket 34 such that the line 18 secures the projecting arm 38 of the lower pulley bracket 34 in abutment with an interior surface 40 of the pole 12 wherein the lower pulley bracket 34 is secured to the pole 12 and positioned in the lower aperture 26. Similarly, the upper pulley 32 is coupled to the pole 12 by an upper pulley bracket 42. The upper pulley bracket 42 has a slotted end 44 and a projecting arm 46 extending outwardly opposite the slotted end 44 of the upper pulley bracket 42 such that the line 18 secures the projecting arm 46 of the upper pulley bracket 42 in abutment with the interior surface 40 of the pole 12 wherein the upper pulley bracket 42 is secured to the pole 12.

Each of a first opening 48 and a second opening 50 extends into the top segment 20B. The first opening 48 and the second opening 50 are positioned on opposite sides of the top segment 20B. The boom arm 14 is coupled to and extends from the top segment 20B. The boom arm 14 has a rectangular cross-sectional shape perpendicular to a longitudinal axis of the boom arm 14. The boom arm 14 is insertable through the first opening 48 and the second opening 50 to couple the boom arm 14 to the top segment 20B. Each of the first opening 48 and the second opening 50 may be reinforced by positioning of a durable plate or the like adjacent to a respective bearing surface of the pole 12 when torque is applied to the boom arm 14. A distance between the first opening 48 and the upper end 22 of the top segment 20B is less than a distance between the second opening 50 and the upper end 22 of the top segment 20B wherein the first opening 48 is closer to the upper end 24 of the top segment 20B than the second opening 50 and the boom arm 14 is angled to extend outwardly and upwardly from the top segment 20B when coupled to the top segment 20B. A boom pulley 54 is coupled to the boom arm 14 proximate a distal end 56 of the boom arm 14 relative to the pole 12. The line 18 extends through the boom pulley 54. The winch 16 may be coupled to the pole 12 under the lower aperture 26 using screws as shown. Alternatively, the winch may be attached using ropes, straps, ties, or the like. The line 18 is coupled to and extends from the winch 16. The line 18 extends into the pole 12 through the lower aperture 26 and out of the pole 12 through the upper aperture 30. A hook 66 is coupled to a distal end 68 of the line 18 relative to the winch 16.

In use, the segments 20 of the pole 12 may be transported to a desired position and assembled. A bottom segment 20C may be inserted into the ground a sufficient amount to stabilize the pole 12 when assembled. The boom arm 14 may be attached to the pole 12. The winch 16 may also be attached to the pole 12 if not kept on the pole 12. The upper pulley bracket 42 and lower pulley bracket 34 are attached to the pole 12 as described above when the line 18 is threaded through the pole 12. The line 18 is further engaged to the boom pulley 54. The winch 16 may then be used in a conventional manner to elevate and hold food or other items suspended over a ground surface as may be desired when camping or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable lifting pole device comprising:

a pole, said pole having a plurality of segments, said segments including a medial segment and a top segment, each said segment having an upper end and a lower end, each said segment tapering from said lower end to said upper end;

a lower aperture extending through said medial segment;

an upper aperture extending through said top segment;

a boom arm coupled to and extending from said top segment;

a winch coupled to said pole under said lower aperture;

a line, said line being coupled to and extending from said winch, said line extending into said pole through said lower aperture, said line extending out of said pole through said upper aperture;

a boom pulley coupled to said boom arm, said line extending through said boom pulley;

a hook coupled to a distal end of said line relative to said winch;

a lower pulley, said lower pulley being coupled to said pole and positioned in said lower aperture; and a lower pulley bracket, said lower pulley being coupled to said pole by said lower pulley bracket, said lower pulley bracket having a slotted end and a projecting arm extending outwardly in an opposite direction to said slotted end of said lower pulley bracket such that said line exerts force onto said projecting arm of said lower pulley bracket towards an interior surface of said pole.

2. The device of claim 1, further comprising said upper end of each said segment being insertable into said lower end of an adjacently positioned said segment wherein said segments are stackable to form said pole.

3. The device of claim 1, further comprising an upper pulley, said upper pulley being coupled to said pole and positioned in said upper aperture.

4. The device of claim 3, further comprising an upper pulley bracket, said upper pulley being coupled to said pole by said upper pulley bracket, said upper pulley bracket having a slotted end and a projecting arm extending outwardly in an opposite direction to said slotted end of said upper pulley bracket such that said line exerts force onto said projecting arm of said upper pulley bracket towards an interior surface of said pole.

5. The device of claim 1, further comprising each of a first opening and a second opening extending into said top segment, said first opening and said second opening being positioned on opposite sides of said top segment, said boom arm being insertable through said first opening and said second opening to couple said boom arm to said top segment.

6. The device of claim 5, further comprising a distance between said first opening and said upper end of said top segment being less than a distance between said second opening and said upper end of said top segment wherein said first opening is closer to said upper end of said top segment than said second opening and said boom arm is angled to extend outwardly and upwardly from said top segment when coupled to said top segment.

7. The device of claim 1, further comprising said boom arm having a rectangular cross-sectional shape perpendicular to a longitudinal axis of said boom arm.

8. A portable lifting pole device comprising:

a pole, said pole having a plurality of separable segments, said segments including a medial segment and a top segment, each said segment having an upper end and a lower end, each said segment tapering from said lower end to said upper end, comprising said upper end of each said segment being insertable into said lower end of an adjacently positioned said segment wherein said segments are stackable to form said pole;

a lower aperture extending through said medial segment;

a lower pulley, said lower pulley being coupled to said pole and positioned in said lower aperture;

an upper aperture extending through said top segment;

an upper pulley, said upper pulley being coupled to said pole and positioned in said upper aperture;

each of a first opening and a second opening extending into said top segment, said first opening and said second opening being positioned on opposite sides of said top segment;

a boom arm coupled to and extending from said top segment, said boom arm having a rectangular cross-sectional shape perpendicular to a longitudinal axis of said boom arm, said boom arm being insertable through said first opening and said second opening to couple said boom arm to said top segment;

a distance between said first opening and said upper end of said top segment being less than a distance between said second opening and said upper end of said top segment wherein said first opening is closer to said upper end of said top segment than said second opening and said boom arm is angled to extend outwardly and upwardly from said top segment when coupled to said top segment;

a winch coupled to said pole under said lower aperture;

a line, said line being coupled to and extending from said winch, said line extending into said pole through said lower aperture, said line extending out of said pole through said upper aperture;

a lower pulley bracket, said lower pulley being coupled to said pole by said lower pulley bracket, said lower pulley bracket having a slotted end and a projecting arm extending outwardly opposite said slotted end of said lower pulley bracket such that said line exerts force onto said projecting arm of said lower pulley bracket towards an interior surface of said pole;

an upper pulley bracket, said upper pulley being coupled to said pole by said upper pulley bracket, said upper pulley bracket having a slotted end and a projecting arm extending outwardly opposite said slotted end of said upper pulley bracket such that said line exerts force onto said projecting arm of said upper pulley bracket towards an interior surface of said pole;

a boom pulley coupled to said boom arm, said line extending through said boom pulley; and a hook coupled to a distal end of said line relative to said winch.

* * * * *